Oct. 4, 1938.   R. LEE   2,132,304
SAFETY ATTACHMENT FOR AUTOMOTIVE VEHICLES
Filed March 1, 1938
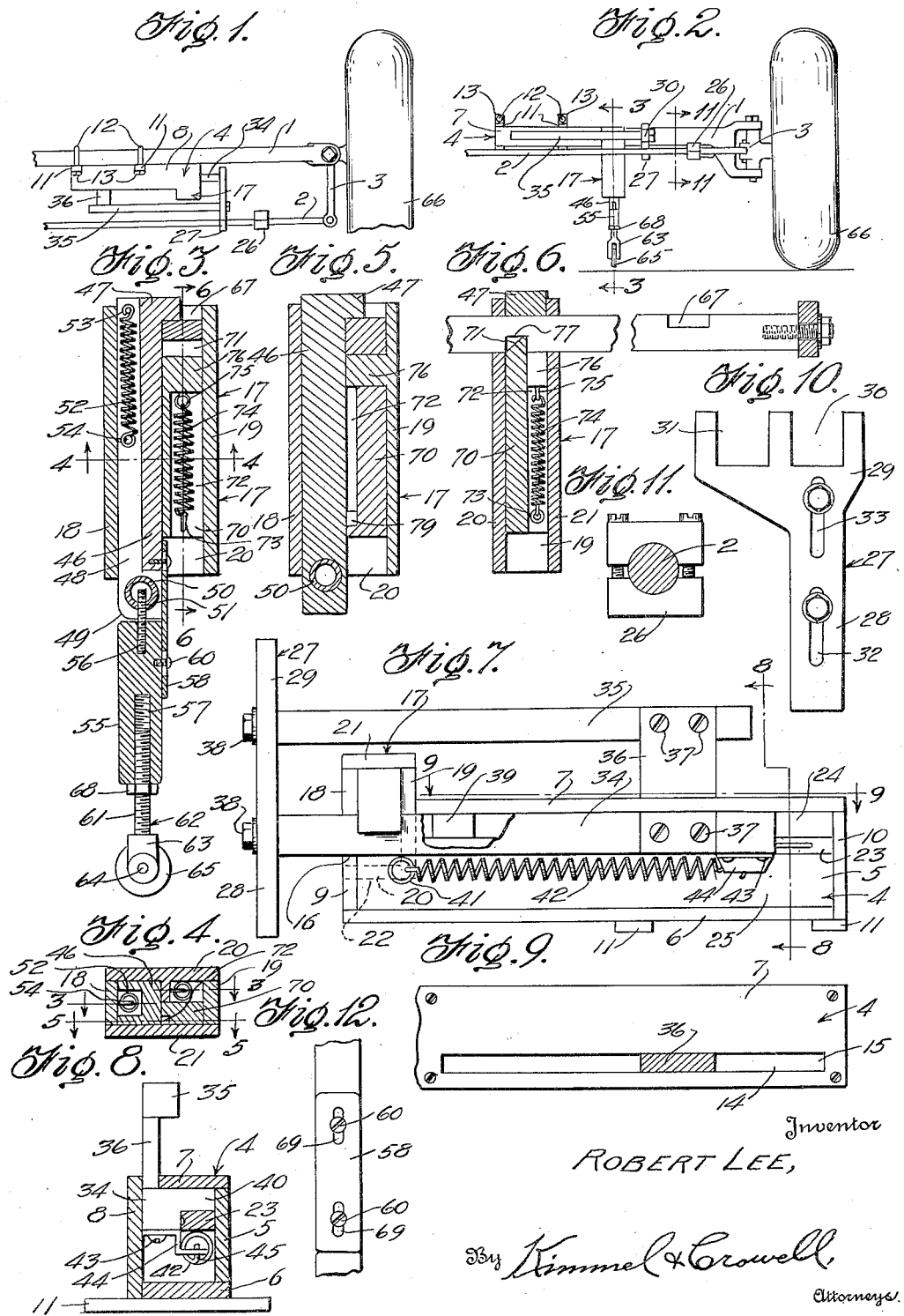
Inventor
ROBERT LEE,
By Kimmel & Crowell
Attorneys Patented Oct. 4, 1938

2,132,304

UNITED STATES PATENT OFFICE 2,132,304

SAFETY ATTACHMENT FOR AUTOMOTIVE VEHICLES

Robert Lee, Savannah, Ga.

Application March 1, 1938, Serial No. 193,356

7 Claims. (Cl. 280—89)

This invention relates to a safety attachment for automotive vehicles, more particularly to what may be termed a blow-out control, and has for its object to provide, in a manner as hereinafter set forth means for automatically preventing the sudden swerving of the vehicle, which occurs on a blow-out in a front wheel whereby the possibility of accidents resulting from such swerving is reduced to a minimum.

The invention further aims to provide in a manner as hereinafter set forth means acting to arrest the shifting of the steering connections between the knuckles of the front wheels of the vehicle in a direction to prevent the swerving of the vehicle over or from off of a road surface when a blow-out occurs on either one of said wheels whereby possibility of collisions and accidents is materially reduced.

Further objects of the invention are to provide in a manner as hereinafter set forth, a safety attachment for the purpose referred to which is simple in its construction and arrangement, strong, durable, compact, readily installed with respect to an automotive vehicle, thoroughly efficient in its use, automatic in its action and comparatively inexpensive to manufacture.

Embodying the objects aforesaid and others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawing:

Figure 1 is a top plan view of the attachment as applied to the front axle of the vehicle, Figure 2 is a rear elevation of the attachment as applied to the front axle of the vehicle, Figure 3 is a section on lines 3—3 of Figures 2 and 4, Figure 4 is a section on line 4—4 of Figure 3, Figure 5 is a section on lines 5—5 of Figure 4, Figure 6 is a section on line 6—6 of Figure 3, Figure 7 is a top plan view, upon an enlarged scale of the attachment, Figure 8 is a section on line 8—8 of Figure 7, Figure 9 is a section on line 9—9 of Figure 7, Figure 10 is a side elevation of the retainer element, Figure 11 is a section on line 11—11 of Figure 2, and Figure 12 is an elevation of the yielding coupler.

The vehicle is to have installed therewith a pair of attachments. The attachments of the pair are oppositely disposed and of like form. One attachment is associated with one and the other with the other front wheel of the vehicle. The attachments are not actuated simultaneously on a blow out. An attachment is actuated when that front wheel with which it is associated has a blow out. The attachments are to be anchored to the rear of the front axle 1 of the vehicle. The attachments are disposed in inner endwise spaced relation and positioned in proximity to the ends of axle 1. The attachments act as supports and bearings for the shifting connections 2 for and which are common to and couple the knuckles 3 together to provide for their operation in unison. The shifting connections 2 are what is known as the tie bar between the steering knuckles of the front wheels of the vehicle.

As the pair of attachments are of like form, but one will be described, as the description of one will apply to the other. Each attachment includes a horizontally disposed housing 4 positioned against the rear side of axle 1. The housing 4 includes a bottom 5, a front wall 6, a rear wall 7, a removable top wall or lid 8, and a pair of side walls 9, 10. Attached to the outer face of front wall 6 are spaced vertically disposed apertured strips 11 extending above and depending from housing 4. The strips 11 abut axle 1 and coact with the yokes 12 and nuts 13 for clamping the housing 4 in rearwardly extended relation to the axle.

The wall 7 is of less length than wall 6 and extends from the wall 10 to a point removed from wall 9. The upper portion of wall 7 is formed lengthwise thereof with a rectangular slot 14 having its end walls 15 spaced from the ends of wall 7. The wall 6 and bottom 5 extend from the wall 9 to the wall 10. The upper rear corner of wall 9 is cut out as at 16.

There is connected to and depending from one end of housing 4 a vertically disposed open top and bottom casing 17 formed of a pair of side parts 18, 19 a front part 20 and a rear part 21. The parts 18, 19 have reduced upper portions which are secured to the end of wall 7 and the front edge of wall 9. The reduced upper portion of part 19 coacts with the cutout 16 to form a groove for a purpose referred to. The inner edges of the upper reduced portions of the parts 18, 19 are flush with the inner face of the wall 7. The lower portions of the parts 18, 19 extend under the bottom 5 as indicated in dotted lines 22, Figure 7. The outer face of part 19 is flush with the outer face of wall 9. The rear part 21 extends from the bottom to the top of parts 18, 19. The front part 20 extends from the bottom of the parts 18, 19 to the bottom 5 of housing 4. The parts 18, 19, 20 and 21 of the casing 17 are suitably secured together.

The housing 4 has arranged therein, as well as lengthwise thereof a partition 23 which is seated on bottom 5 and extends from the wall 9 to the wall 10. The partition 23 is suitably anchored to housing 4 and provides the latter with a guide passage 24 and a groove 25.

The attachment includes a normally latched slidably mounted spring controlled holder means which acts when released to prevent the swerving of the vehicle in case of a blow-out in a front wheel. The said means is also latched when in active position. The said holder means includes an abutment 26 which is clamped to the shifting connections 2 in proximity to an end of the latter. The said means includes a holder or retainer element 27 which is disposed in the inward path of travel of the abutment 26 to arrest the shift of the connections 2 if the latter are moved in a direction transversely relative to the chassis, that is to say when the connections 2 tend to move inwardly on a possible swerve of the vehicle due to a blow-out. The element 27 consists of a shank 28 and a head 29. The latter is formed with a pair of superposed cut-outs or grooves 30, 31 for selectively receiving connections 2 disposed at different heights, as on some vehicles the connections 2 are disposed at a greater height than connections 2 on other vehicles. The grooves 30, 31 are of less area than abutment 26 and provide guides for the connections 2. Each groove includes a vertically disposed front end wall and horizontal top and bottom walls. The element 27 is horizontally disposed and with each of its grooves opening at the rear end thereof. The bottom wall of each groove constitutes a support and bearing for connections 2. The shank 28 is formed lengthwise thereof with a pair of spaced endwise aligned slots 32, 33 for a purpose to be referred to. The holder means includes a pair of carrier rods 34, 35 for the element 27. The rod 34 is spring controlled, slidably mounted in the guide passage 24 and extends from the housing 4 through the groove provided by the cut-out 16 and the upper portion of part 18 of casing 17. The rod 35 is arranged exteriorly of the housing 4 and adjacent housing wall 7. The rods 34 and 35 are coupled together to provide for the moving thereof in unison by a coupling plate 36 which extends through slot 14. The plate 36 is secured to rods 34, 35 by the holdfast means 37. The plate 36 is arranged in proximity to the inner ends of the rods. The outer ends of rods 34, 35 abut the shank 28 at the slots 32, 33 respectively. Extending through the slots 32, 33 and engaging in the outer ends of the rods 34, 35 are removable holdfast means 38 for securing the rods to the shank 28. The slots 32, 33 permit of adjusting element 27 forwardly and rearwardly with respect to the rods when the holdfast means 38 is loosened for the purpose of element 27 overlapping connections 2. The rod 34 slides on the partition 23 and upon a support 39 arranged in passage 24. The rod 34 at its inner end has a depending lug 40 which rides on the bottom of passage 24 and constitutes a combined guide and coupler therefor.

Arranged within the groove 25 and anchored at one end, as at 41 to a side of the partition 23 is a coiled controlling spring 42 for the rod 34. The latter has connected to one side thereof, as at 43 a bracket 44 which extends into the groove 25 and is connected to the other end of spring, as at 45. The holder means is normally latched in inactive position against the action of spring 42.

The attachment includes a latching structure for releasably retaining the holder means in inactive position. The said structure includes an upstanding channel shaped latching member 46 slidably mounted in and extending above and depending from casing 17. The upper end of member 46 is formed with a laterally extending lug or nose 47. The lower end of member 46 is bifurcated as at 48 and rounded, as at 49. Arranged in the bifurcated lower end of member 46 is a revoluble sleeve 50 having a threaded opening 51. Positioned in the channel of member 46 is a controlling spring 52 which has one end connected to member 46, as at 53 and its other end fixed to part 18 of casing 17, as at 54. Disposed in endwise alignment with the member 46 is an upstanding coupler bar 55, having extended from its upper end, a threaded non-headed bolt 56 which engages with the threaded opening 51 for connecting sleeve 50 and bar 55 together. The bar 55 is formed with a threaded socket 57 opening at the lower end thereof. The member 47 is hinged to the bar 55 by a resilient strap like hinge 58. Holdfast means 60 are employed for securing hinge 58 to member 46 and bar 55 respectively. Adjustably engaging with the wall of socket 57 is the adjustable threaded shank 61 of trip wheel carrier 62. The latter includes an inverted yoke 63 from which the shank 61 extends and has mounted therein a shaft 64 upon which a trip wheel 65 is mounted. The bottom portion of the tread of wheel 65 is normally above the bottom portion of the tread of a front wheel 66 of the vehicle when said front wheel is inflated. The lug or nose 47 of member 46 normally seats in a groove or cut-out 67 formed in the rod 34 for the purpose of latching the element 27 of the holder means in inactive position. If a blow-out occurs in wheel 66 the weight of the vehicle will lower axle 1 carrying housing 4 and casing 17 therewith whereby wheel 65 will travel on the ground causing the lug or nose 47 to be moved clear of groove or cut-out 67, the holder means released and element 27 projecting laterally from housing 4 to a point in close proximity to abutment 26. The element 27 will then function to arrest shift of connections 2 resulting in the prevention of a swerving action being imparted to the vehicle. The shank 61 carries a lock nut 68. The hinge 58 is formed with slots 69 for the passage of the holdfast means 60 and which permits of adjusting the hinge when desired.

When element 27 is projected to function as a holder or retainer with respect to connections 2, it is automatically latched in holding position, and for such purpose a latching member 70 is employed. The member 70 is slidably arranged within the casing 17 against the member 46, has a beveled upper end 71 and a lengthwise groove 72. Attached to member 70, as at 73 is the lower end of a contracting spring 74. The upper end of the latter is attached, as at 75 to a guide 76 against which rod 34 and members 46, 70 ride. The rod 34 in its lower face is mortised, as at 77, into which the upper end of the member 70 extends when element 27, of the holder means is projected whereby the element 27 is latched in position to perform its holding function. The lower face of the rod 34 normally retains the member 70 clear of the mortise 77 when the holder means is shifted to and in inactive position. The member 70 is released from latching position, when returning the holder means to inactive position, by a stop lug 79 formed on member 46 and extending into groove 72. When casing 17 moves upwardly, due to the inflation of wheel 66 it carries member 70 therewith until the bottom wall of groove 72 abuts the lug 79 and which holds the member 70 stationary, and as the casing continues to move upwardly it provides for the mortise 77 to clear the upper end 71 of member 70 and at which time, the holder means can be shifted manually in a direction and to an extent to have the lug or nose 47 of member 46 engage in the cut-out or groove 67 whereby the holder means is latched in inactive position.

What I claim is:

1. In a blow-out control attachment for automotive vehicles, an abutment adapted to be fixed to the tie bar for the knuckles of the front wheels of the vehicle, a holder means adapted to be secured onto and bodily moving with the front axle of the vehicle on the lowering of the axle when a blow-out occurs, said means including a spring controlled projectable holder element for correlation with said abutment, latching means normally retaining said element in inactive position and including a rotatable member having a tread surface normally arranged above with the tread of a front wheel of the vehicle when said wheel is inflated and automatically releasing said element when a blow-out occurs in such wheel to permit of said element being projected in juxtaposition to and to coact with said abutment to arrest swerving of the vehicle, and a normally inactive latching means made active on the projecting of said element for latching the latter in active position.

2. In a blow-out control attachment for automotive vehicles, an abutment adapted to be fixed to the tie bar for the knuckles of the front wheels of the vehicle, a holder means including a supporting structure adapted to be secured onto and bodily moving with the front axle of the vehicle on the lowering of the axle when a blow-out occurs, said means including a spring controlled projectable holder element mounted in said structure for correlation with said abutment, latching means normally retaining said element in inactive position and including a rotatable member having a tread surface normally arranged above the tread of a front wheel of the vehicle when said wheel is inflated and automatically releasing said element when a blow-out occurs in such wheel to permit of said element being projected in juxtaposition to and to coact with said abutment to arrest swerving of the vehicle, a normally inactive latching means made active on the projecting of said element for latching the latter in active position, said holder means having a part thereof formed in its top with a groove and in its bottom with a mortise, one of said latching means coacting with said groove for latching the holder means in inactive position, the other of said latching means coacting with said mortise for latching the holder means in active position, and each of said latching means being spring controlled and slidably mounted in said structure.

3. In a blow-out control attachment for automotive vehicles, an abutment adapted to be fixed to the tie bar for the knuckles of the front wheels of the vehicle, a holder means adapted to be secured onto and bodily moving with the front axle of the vehicle on the lowering of the axle when a blow-out occurs, said means including a spring controlled projectable holder element for correlation with said abutment, latching means normally retaining said element in inactive position and including a rotatable member having a tread surface normally arranged above the tread of a front wheel of the vehicle when said wheel is inflated and automatically releasing said element when a blow-out occurs in such wheel to permit of said element being projected in juxtaposition to and to coact with said abutment to arrest swerving of the vehicle, a normally inactive latching means made active on the projecting of said element for latching the latter in active position, said holder means having a part thereof formed in its top with a groove and in its bottom with a mortise, one of said latching means coacting with said groove for latching the holder means in inactive position, and the other of said latching means coacting with said mortise for latching the holder means in active position.

4. In a blow-out control attachment for automotive vehicles, an abutment adapted to be fixed to the tie bar for the knuckles of the front wheels of the vehicle, a holder means adapted to be secured onto and bodily moving with the front axle of the vehicle on the lowering of the axle when a blow-out occurs, said means including a spring controlled projectable holder element for correlation with said abutment, latching means normally retaining said element in inactive position and including a rotatable member having a tread surface normally arranged above the tread of a front wheel of the vehicle when said wheel is inflated and automatically releasing said element when a blow-out occurs in such wheel to permit of said element being projected in juxtaposition to and to coact with said abutment to arrest swerving of the vehicle, a normally inactive latching means made active on the projecting of said element for latching the latter in active position, said pair of latching means having coacting parts for moving the second mentioned latching means to inactive position to permit of the other latching means being restored to active position.

5. In a blow-out control attachment for automotive vehicles, an abutment adapted to be fixed to the tie bar for the knuckles of the front wheels of the vehicle, a holder means adapted to be secured onto and bodily moving with the front axle of the vehicle on the lowering of the axle when a blow-out occurs, said means including a spring controlled projectable holder element for correlation with said abutment, latching means normally retaining said element in inactive position and including a rotatable member having a tread surface normally arranged above the tread of a front wheel of the vehicle when said wheel is inflated and automatically releasing said element when a blow-out occurs in such wheel to permit of said element being projected in juxtaposition to and to coact with said abutment to arrest swerving of the vehicle, a normally inactive latching means made active on the projecting of said element for latching the latter in active position, said holder means having a part thereof formed in its top with a groove and in its bottom with a mortise, one of said latching means coacting with said groove for latching the holder means in inactive position, and the other of said latching means coacting with said mortise for latching the holder means in active position, said pair of latching means having coacting parts for moving the second mentioned latching means to inactive position to permit of the other latching means being restored to active position.

6. In a blow-out control attachment for automotive vehicles, an abutment adapted to be fixed to the tie bar for the knuckles of the front wheels of the vehicle, a holder means adapted to be secured onto and bodily moving with the front axle of the vehicle on the lowering of the axle when a blow-out occurs, said means including a spring controlled projectable holder element for correlation with said abutment, latching means normally retaining said element in inactive position and including a rotatable member having a tread surface normally arranged above the tread of a front wheel of the vehicle when said wheel is inflated and automatically releasing said element when a blow-out occurs in such wheel to permit of said element being projected in juxtaposition to and to coact with said abutment to arrest swerving of the vehicle, and a normally inactive latching means made active on the projecting of said element for latching the latter in active position, said element being provided with means for the passage of said tie bar.

7. In a blow-out control attachment for automotive vehicles, an abutment adapted to be fixed to the tie bar for the knuckles of the front wheels of the vehicle, a holder means adapted to be secured onto and bodily moving with the front axle of the vehicle on the lowering of the axle when a blow-out occurs, said means including a spring controlled projectable holder element for correlation with said abutment, latching means normally retaining said element in inactive position and including a rotatable member having a tread surface normally arranged above the tread of a front wheel of the vehicle when said wheel is inflated and automatically releasing said element when a blow-out occurs in such wheel to permit of said element being projected in juxtaposition to and to coact with said abutment to arrest swerving of the vehicle, a normally inactive latching means made active on the projecting of said element for latching the latter in active position, said holder means having a part thereof formed in its top with a groove and in its bottom with a mortise, one of said latching means coacting with said groove for latching the holder means in inactive position, and the other of said latching means coacting with said mortise for latching the holder means in active position, said element being provided with means for the passage of said tie bar.

ROBERT LEE.